United States Patent
Shodo

[11] Patent Number: 6,061,317
[45] Date of Patent: May 9, 2000

[54] OPTICAL PICKUP HAVING A LIGHT-RECEPTION PHOTODIODE AND A MONITORING PHOTODIODE

[75] Inventor: Kenzo Shodo, Kyoto, Japan

[73] Assignee: Rohm Co., Ltd., Kyoto, Japan

[21] Appl. No.: 08/985,280

[22] Filed: Dec. 4, 1997

[30] Foreign Application Priority Data

Dec. 5, 1996 [JP] Japan .................................. 8-325030

[51] Int. Cl.[7] ................................. G11B 3/90; G11B 7/00
[52] U.S. Cl. ............................ 369/54; 369/116; 369/120
[58] Field of Search ...................................... 369/100, 109, 369/110, 112, 53, 54, 103, 106, 116, 120 124

[56] References Cited

FOREIGN PATENT DOCUMENTS 7-192295   7/1995   Japan .

*Primary Examiner*—Paul W. Huber
*Attorney, Agent, or Firm*—Arent, Fox, Kintner, Plotkin & Kahn

[57] ABSTRACT

An optical pickup that does not require adjustment of the input/output characteristic of its automatic power control circuit to keep its signal output level at a specific level is proposed. In an optical pickup comprising a light-reception photodiode for converting light reflected from a disk into a current signal, a current-to-voltage converter for converting the current signal outputted from the light-reception photodiode into a voltage signal, a monitoring photodiode for converting part of the light emitted from a semiconductor laser device into a current signal, and an automatic power control circuit for controlling the semiconductor laser device by feedback based on the current signal outputted from the monitoring photodiode, a pair of photodiodes that convert a light signal into a current signal with equal efficiency are used as the light-reception and monitoring photodiodes.

6 Claims, 4 Drawing Sheets

OPTICAL PICKUP HAVING A LIGHT-RECEPTION PHOTODIODE AND A MONITORING PHOTODIODE

BACKGROUND OF THE INVENTION

1. Field of the Invention

The present invention relates to an optical pickup as used in a data storage device such as an optical or magneto-optical disk device to record and reproduce data to and from a disk-type data storage medium.

2. Description of the Prior Art

FIG. 4 shows an example of the construction of a conventional optical pickup. This optical pickup operates as follows. A semiconductor laser chip 1 emits a laser beam in accordance with a current supplied from a laser driving circuit 2, which supplies the current to the semiconductor laser chip 1 in accordance with a control signal (voltage signal) produced by an automatic power control circuit 11. As the laser beam emitted from the semiconductor laser chip 1 is shone onto a disk 100 used as a data storage medium, it is made into a light spot S on the disk 100 through an optical system, which also serves to direct the light reflected from the disk 100 to a light-reception photodiode 4.

The light-reception photodiode 4 converts the received light into a current signal, and this current signal is further converted into a voltage signal by a current-to-voltage converter 5 for light reception. On the other hand, part of the laser beam emitted from the semiconductor laser chip 1 (more specifically, that part of the laser beam which is emitted from the side of the semiconductor laser chip 1 opposite to the optical system 3) is converted into another current signal by a monitoring photodiode 6.

The automatic power control circuit (hereafter referred simply as the "APC circuit") 11 feeds the control signal to the laser driving circuit 2 in accordance with the current signal fed from the monitoring photodiode 6 in such a way that the semiconductor laser chip 1 emits the laser beam at a constant power. That is, the automatic power control circuit 11 provides feedback control of the semiconductor laser chip 1.

In the optical pickup, the APC circuit 11 is indispensable for the following reason. In the optical pickup, it is essential that its "signal output level", that is, the level of the voltage signal obtained from the optical pickup (i.e. from its current-to-voltage converter 5 for light reception), be kept at a specific level. However, it is impossible to keep constant the power of the laser beam emitted from the semiconductor laser chip 1 simply by controlling it in a fixed and stable manner all the time, because the power of the laser beam not only depends on the characteristics of the individual semiconductor laser chip 1, but also varies greatly with ambient temperature. Thus, it is impossible to keep constant the signal output level of the optical pickup without using the APC circuit 11.

On the other hand, in general, the "conversion efficiency" of a photodiode, that is, the efficiency with which the photodiode converts a light signal into a current signal, depends heavily on the characteristics of the individual photodiode. This often causes the light-reception photodiode 4 and the monitoring photodiode 6 to have different conversion efficiency and, in addition, the degree to which they differ (i.e. the difference in the conversion efficiency) varies from one optical pickup to another. As a result, whereas it is possible at least to keep the signal output level constant as long as the APC circuit 11 has a fixed input/output characteristic, it is not always possible to keep the signal output level at a specific level since the level at which it is fixed differs from one optical pickup to another.

To overcome this problem, the APC circuit 11 of the above conventional optical pickup is so designed that its input/output characteristic is adjustable. Specifically, as shown in FIG. 4, the APC circuit 11 typically includes a variable resistor 111, a constant voltage source 72, and an operational amplifier 73 that has its non-inverting input terminal (+) connected to the constant voltage source 72 and its inverting input terminal (−) connected to the variable resistor 111. The operational amplifier 73 receives, at its non-inverting input terminal (+), a predetermined voltage and, at its inverting input terminal (−), a voltage signal obtained by converting the current signal from the monitoring photodiode 6 by means of the variable resistor 111, and feeds its output to the laser driving circuit 2. Thus, the input/output characteristic of the APC circuit 11 can be varied by varying the resistance of the variable resistor 111.

As described above, a conventional optical pickup needs to be provided with an APC circuit whose input/output characteristic is adjustable. This means that a conventional optical pickup requires an extra component, i.e. a variable-resistance circuit, to allow adjustment of the input/output characteristic of its APC circuit, and that the production of a conventional optical pickup requires an extra process for adjusting the input/output characteristic of its APC circuit to set its signal output level at a specific level. Quite inconveniently, this has been posing a limit on cost reduction of optical pickups.

SUMMARY OF THE INVENTION

An object of the present invention is to provide an optical pickup that does not require adjustment of the input/output characteristic of its APC circuit to keep its signal output level at a specific level, that is, an optical pickup that does not require use of a variable-resistance circuit for varying the input/output characteristic of its APC circuit and that therefore does not require, in its production, a process for adjusting the input/output characteristic of its APC circuit to set its signal output level at a specific level, that is, to provide an optical pickup that can be produced at lower cost.

To achieve the above object, according to the present invention, in an optical pickup provided with a light-reception photodiode for converting light reflected from a disk into a current signal, a current-to-voltage converter for converting the current signal outputted from the light-reception photodiode into a voltage signal, a monitoring photodiode for converting part of the light emitted from a light source into a current signal, and an automatic power control circuit for controlling the light source by feedback based on the current signal outputted from the monitoring photodiode, a plurality of photodiodes that convert a light signal into a current signal with equal efficiency are used as the light-reception and monitoring photodiodes.

The reason why a conventional optical pickup requires adjustment of the input/output characteristic of its APC circuit is that, since the conversion efficiency of photodiodes, even if they satisfy a certain production standard, varies greatly from one photodiode to another, the light-reception and monitoring photodiodes in most cases show different conversion efficiency and, in addition, the degree to which they differ varies from one optical pickup to another. To overcome this problem, the present invention exploits the fact that, even if different photodiodes have different conversion efficiency, there certainly exists more than one photodiode that has equal conversion efficiency.

When, as in the present invention, a pair of photodiodes having equal conversion efficiency are used as the light-reception and monitoring photodiodes, even though the conversion efficiency varies from one pair to another, it is possible, at least within one optical pickup, to keep its signal output level at a specific level, provided that the other characteristics of the constituent components of the optical pickup are made equal, such as the input/output characteristic of the APC circuit and the ratio of the intensity of the laser beam directed to the monitoring photodiode for conversion into a current signal to the total intensity of the laser beam emitted from the light source (semiconductor laser chip).

The above-described optical pickup according to the present invention may further be provided with a holography element for deflecting the light reflected from the disk to direct it to the light-reception photodiode. Moreover, this optical pickup may further be provided with a reflecting means for reflecting the light reflected from the disk and deflected by the holography element to direct it to the light-reception photodiode.

In the optical pickup according to the present invention, it is preferable that the current-to-voltage converter and the automatic power control circuit be each formed as an integrated circuit and be both mounted on a single substrate, and that the light-reception and monitoring photodiodes be also mounted on this substrate.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
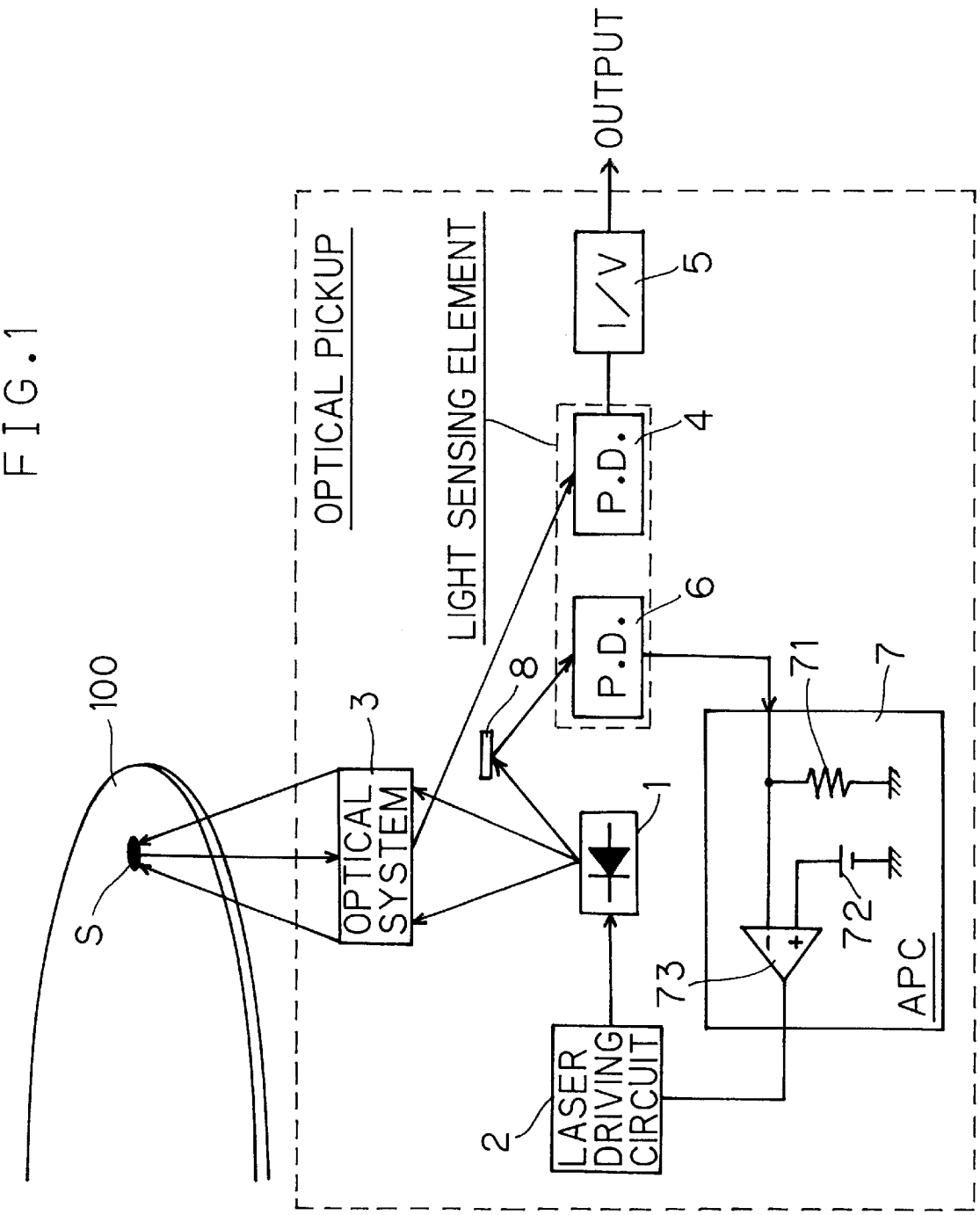
FIG. 1 is a diagram schematically showing the construction of the principal part of an optical pickup embodying the present invention.
Figure 4:
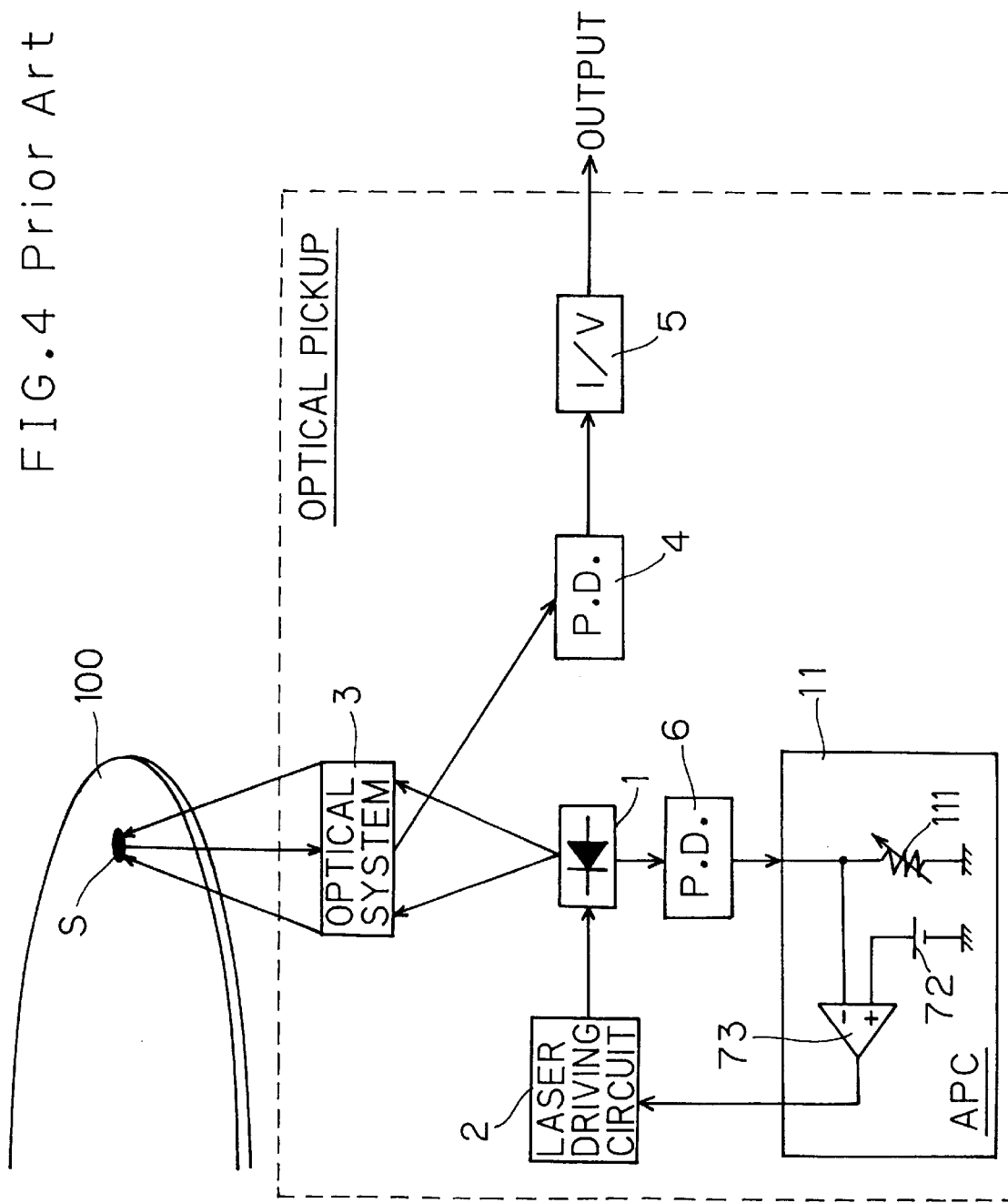
FIG. 4 is a diagram schematically showing the construction of the principal part of a conventional optical pickup.

Hereinafter, an embodiment of the present invention will be described with reference to the drawings. FIG. 1 schematically shows the construction of the principal part of an optical pickup of the invention. In FIG. 1, numeral 7 represents an APC circuit, and numeral 8 represents a mirror serving as a reflecting means. This APC circuit 7 operates in the same manner as the APC circuit 11 in the conventional optical pickup shown in FIG. 4. Note that, in the following descriptions, such components as are found also in the conventional optical pickup shown in FIG. 4 are identified with the same reference numerals, and overlapping explanations will not be repeated.

The optical pickup of the embodiment differs from the conventional one mainly in the following three respects. First, a predetermined portion of the laser beam emitted from the semiconductor laser chip 1 is reflected by the mirror 8 and is thereby directed to the monitoring photodiode 6, that is, the monitoring photodiode 6 receives part of the laser beam emitted from that side of the semiconductor laser chip 1 which faces the optical system 3. This construction is generally called the front monitoring type, and contributes to the miniaturization of the optical pickup. Second, as shown in FIG. 1, the APC circuit 7 has a fixed resistor 71 instead of the variable resistor 111 used in the APC circuit 11 of the conventional optical pickup. Third, photodiodes having equal conversion efficiency are used as the light-reception and monitoring diodes 4 and 6.

Now, let the conversion efficiency of the light-reception photodiode 4 be a, that of the monitoring photodiode 6 be a', the conversion efficiency of the current-to-voltage converter 5 (i.e. the efficiency with which it converts a current signal into a voltage signal) be b, the resistance of the fixed resistor 71 in the APC circuit be b', and the output voltage of the constant voltage source 72 be T. Further, suppose that k % of the laser beam emitted from the semiconductor laser chip 1 passes through the optical system 3 and is reflected by the disk 100 eventually to enter the light-reception photodiode 4, and that k' % of the same laser beam is reflected by the mirror 8 eventually to enter the monitoring photodiode 6. Then, the APC circuit 7 needs to control the power $L_P$ of the laser beam emitted from the semiconductor laser chip 1 such that $$T = L_P\{(k'/100) \times a' \times b'\}.$$

Hence, the signal output level $O_L$ can be expressed as $$\begin{aligned} O_L &= L_P \times (k/100) \times a \times b \\ &= [T/\{(k'/100) \times a' \times b'\}] \times (k/100) \times a \times b \\ &= (k/k') \times (a/a') \times (b/b') \times T. \end{aligned}$$

In addition, since the light-reception and monitoring photodiodes 4 and 6 have equal conversion efficiency by being formed on a single semiconductor substrate, that is, a=a', the above expression of the signal output level $O_L$ can be further reduced to $$O_L = (k/k') \times (b/b') \times T.$$

As described above, in the optical pickup of the embodiment, the signal output level depends only on k, k', b, b', and T. and these variables are easy to make uniform between individual optical pickups. Thus, it is possible to keep the signal output level at a specific level without adjusting the input/output characteristic of the APC circuit.

As a result, as shown in FIG. 1, the optical pickup of the embodiment allows its APC circuit 7 to have a fixed resistor 71 instead of the variable resistor 111 used in the APC circuit 11 of the conventional optical pickup. This means that it does not require a variable-resistance circuit for varying the input/output characteristic of its APC circuit, nor does it require, in its production, a process for adjusting the input/output characteristic of its APC circuit to set its signal output level at a specific level.

In the optical pickup of the embodiment, it is preferable to use a holography element 9 as a means by which the optical system 3 directs the light reflected from the disk 100 to the light-reception photodiode 4.

Figure 2:
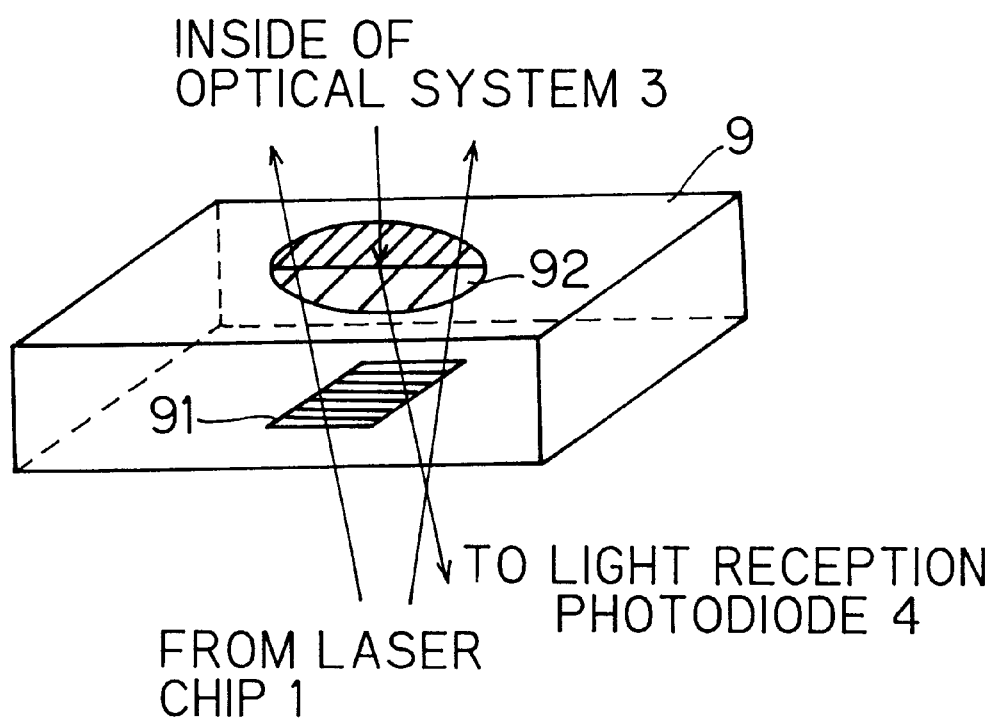
FIG. 2 is a diagram illustrating the workings of a holography element.

As shown in FIG. 2, the holography element 9 is a plate of glass having a diffraction grating 91 for generating triple beams formed on one side and a diffraction grating 92 for refracting the reflected beam formed on the other. The holography element 9 is used with the side on which the triple-beam generating diffraction grating 91 is formed facing the semiconductor laser chip 1. The use of the holography element 9 helps, for example, to reduce the number of the constituent components of the optical pickup and to simplify the assembly process of the optical pickup.

The use of the holography element 9 in the optical system 3 is preferable because, in an optical pickup that employs a holography element in its optical system, the semiconductor laser chip 1, the optical system 3, and other components are positioned with far higher accuracy than in an optical pickup that employs a beam splitter instead. This makes it possible to obtain higher accuracy in the proportions with which, out of the laser beam emitted from the semiconductor laser chip 1, a portion is shone through the optical system 3 onto the disk 100 to be reflected therefrom and directed to the light-reception photodiode 4 and another portion is reflected by the mirror 8 to be directed to the monitoring photodiode 6. Since these proportions directly affect the signal output level, the holography element thus helps keep the signal output level at a specific level with high accuracy.

Figure 3:
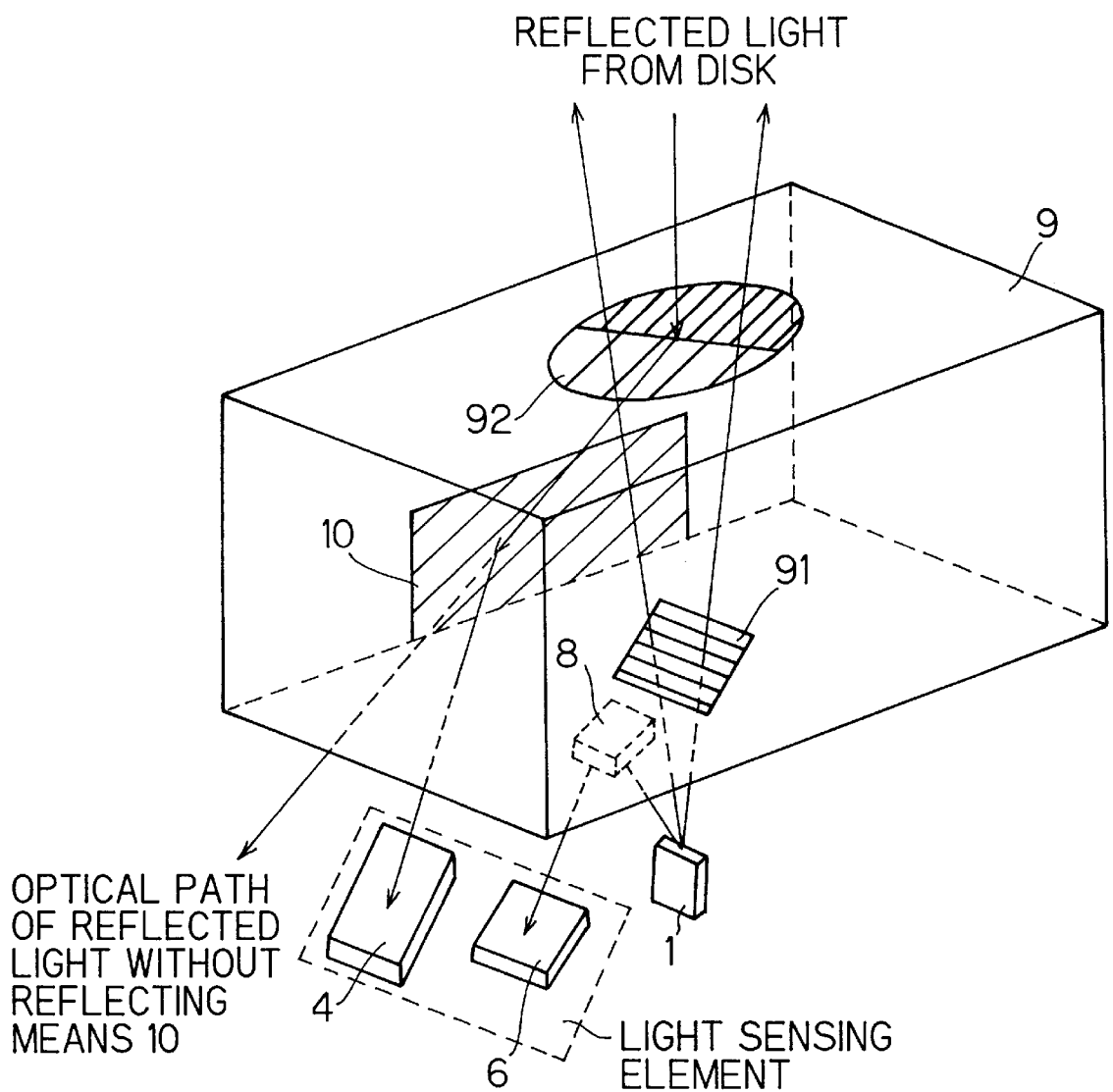
FIG. 3 is a diagram illustrating the workings of the holography element in combination with a reflecting means.

Furthermore, it is preferable that the holography element 9 be provided with a reflecting means 10 on one of its side surfaces. This is because, as shown in FIG. 3, in order for the light reflected from the disk 100 and having passed through the reflected-light-refracting diffraction grating 92 to be directed straight to the light-reception photodiode 4, it is necessary to place the light-reception photodiode 4 in such a position that cannot be secured without making the optical pickup thicker and that is too far apart from the monitoring photodiode 6 to allow the two photodiodes to be formed on a single substrate.

These inconveniences are avoided by providing the holography element 9 with a reflecting means 10 on its side surface, because then, by reflecting the light reflected from the disk 100 and having passed through the reflected-light-refracting diffraction grating 92 by means of the reflecting means 10 and thereby directing the thus reflected light to the light-reception photodiode 4, it is possible to place the light-reception photodiode 4 in such a position that can be secured without making the optical pickup thicker and that is sufficiently near to the monitoring photodiode 6.

The reflecting means 10 does not necessarily have to be provided on the side surface of the holography element 9; it can be placed in any position on the path of the light reflected from the disk 100 and having passed through the reflected-light-refracting diffraction grating 92.

Moreover, in the optical pickup of the embodiment, it is also possible to mount the current-to-voltage converter 5 and the APC circuit 7 as integrated circuits on a substrate and to mount on the same substrate the light-reception and monitoring photodiodes 4 and 6 formed in a semiconductor substrate as a light-sensing element. This contributes to the miniaturization of the optical pickup, to the enhancement of productivity, and to a further cost reduction.

As described heretofore, the optical pickup of the invention allows its signal output level to be kept at a specific level without requiring adjustment of the input/output characteristic of its APC circuit. Accordingly, the optical pickup does not require use of a variable-resistance circuit for varying the input/output characteristic of its APC circuit, nor does it require, in its production, a process for adjusting the input/output characteristic of its APC circuit to set its signal output level at a specific level. Thus, the optical pickup can be produced at lower cost. Moreover, the optical pickup can easily be miniaturized without sacrificing the high accuracy with which it keeps its signal output level at a specific level.

Obviously, many modifications and variations of the present invention are possible in light of the above teachings. It is therefore to be understood that within the scope of the appended claims, the invention may be practiced other than as specifically described.

What is claimed is:

1. An optical pickup comprising:

a light source for emitting light;

a first photodiode for converting light emitted from the light source and then reflected from a disk into a current signal;

current-to-voltage converter for converting the current signal output from the first photodiode into a voltage signal;

a second photodiode for converting part of the light emitted from the light source into a current signal; and an automatic power control circuit for controlling the light source by feedback based on the current signal output from the second photodiode, wherein efficiency of the second photodiode to convert light into current is equal to efficiency of the first photodiode to convert light into current.

2. An optical pickup as claimed in claim 1, further comprising a holography element for deflecting the light reflected from the disk to direct it to said first photodiode.

3. An optical pickup as claimed in claim 2, further comprising a reflecting means for reflecting the light reflected from the disk and deflected by said holography element to direct it to said first photodiode.

4. An optical pickup as claimed in claim 3, wherein the reflecting means is disposed on a side surface of the holography element, said side surface being adjacent to a surface for deflecting the light.

5. An optical pickup as claimed in claim 1, wherein said current-to-voltage converter and said automatic power control circuit are each formed as an integrated circuit and are both mounted on a single substrate, and wherein said first and second photodiodes are also mounted on said substrate.

6. An optical pickup as claimed in claim 1, wherein the automatic power control circuit has a resistor whose resistance is fixed for converting the current signal output from the second photodiode into a voltage signal for controlling power applied to the light source.

* * * * *